(No Model.) 2 Sheets—Sheet 1.
C. BAUMGARTEN.
APPARATUS FOR EXTRACTING OILS.
No. 354,299. Patented Dec. 14, 1886.
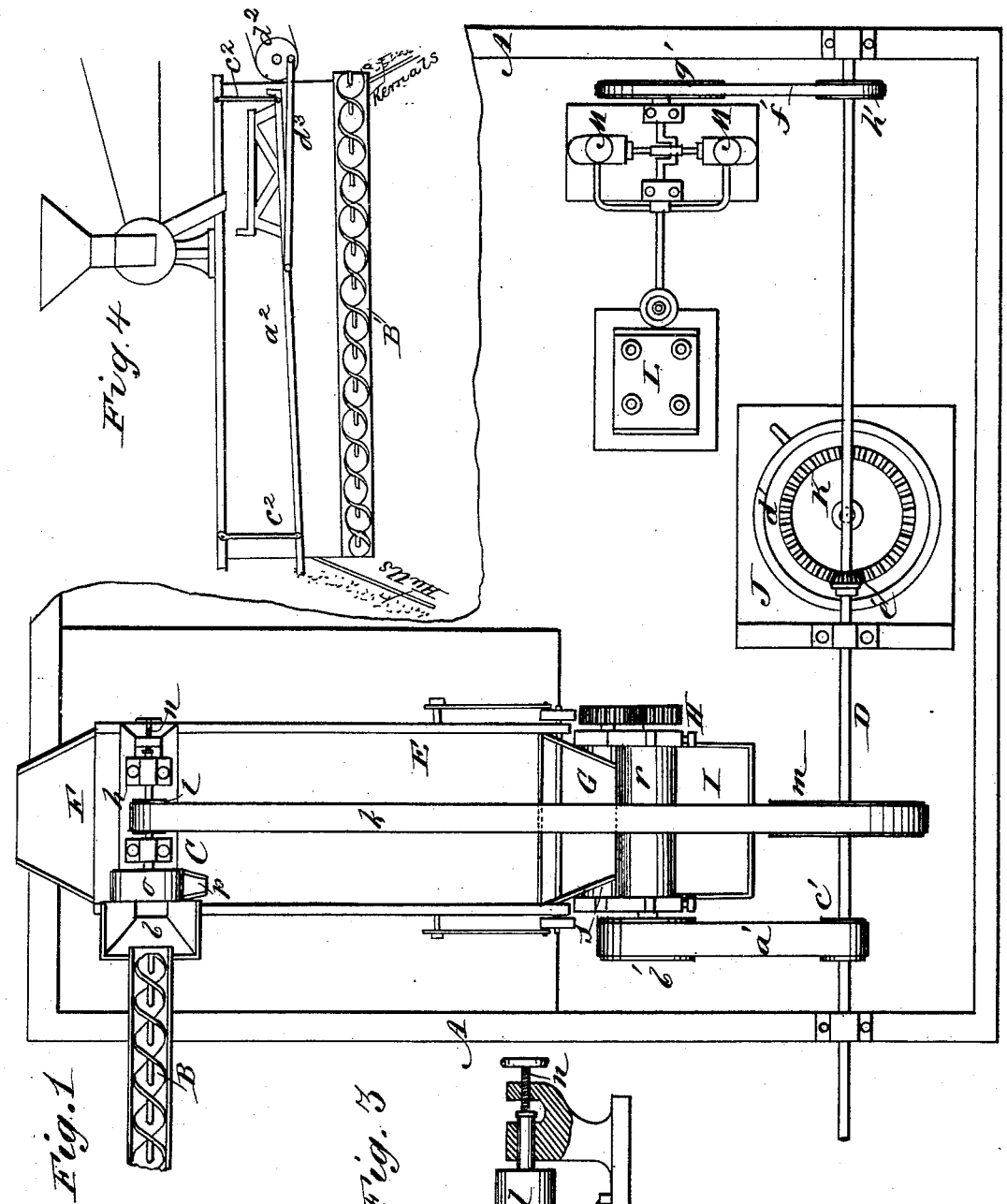
WITNESSES:
C. Neveux
C. Sedgwick
INVENTOR:
C. Baumgarten
BY Munn & Co
ATTORNEYS.

(No Model.) 2 Sheets—Sheet 2.
C. BAUMGARTEN.
APPARATUS FOR EXTRACTING OILS.
No. 354,299. Patented Dec. 14, 1886.
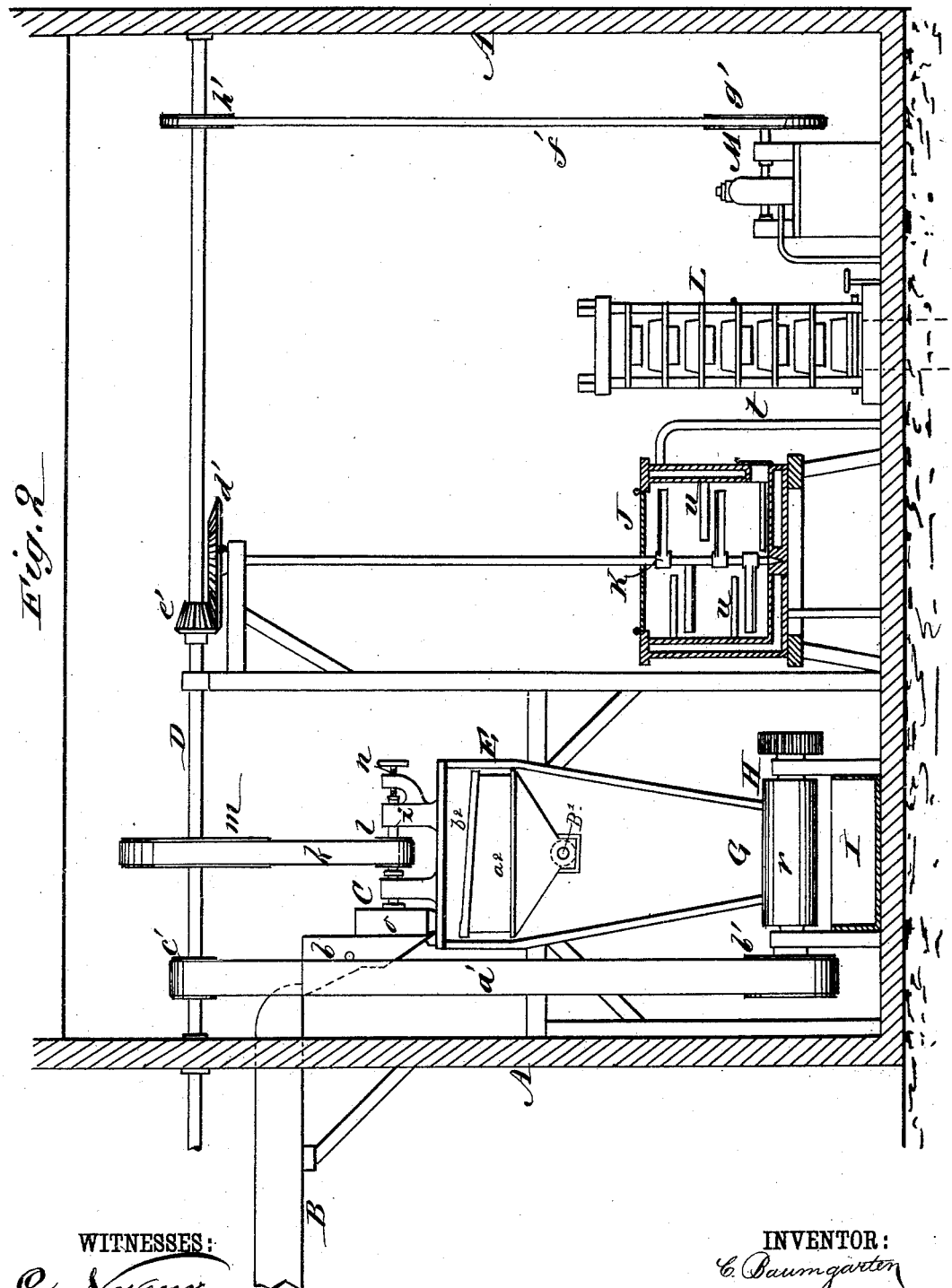
WITNESSES:
C. Neveux
C. Sedgwick
INVENTOR:
C. Baumgarten
BY Munn & Co
ATTORNEYS.

UNITED STATES PATENT OFFICE.

CHRISTIAN BAUMGARTEN, OF SCHULENBURG, TEXAS.

APPARATUS FOR EXTRACTING OILS.

SPECIFICATION forming part of Letters Patent No. 354,299, dated December 14, 1886.

Application filed May 25, 1886. Serial No. 203,210. (No model.)

*To all whom it may concern:*

Be it known that I, CHRISTIAN BAUMGARTEN, of Schulenburg, in the county of Fayette and State of Texas, have invented new and useful Improvements in Extracting Oil from Cotton and other Seeds, of which the following is a full, clear, and exact description.

My invention consists in a novel process and combination of devices or apparatus, substantially as hereinafter shown and described, for extracting the oil from cotton-seeds and other oil-bearing seeds, whereby not only is the oil very perfectly extracted by the treatment to which the seeds are exposed before introducing them to the press, but the necessary plant for the purpose is simple, inexpensive, and compact, so as to be readily within the reach of a large number of gin-owners, and a large quantity of seeds may be worked up in a day, either for home use or export demand of the product, and the hulls, which contain all the elements of a first-rate fertilizer, be retained by the planter for such purpose, or be used as fuel in driving his gins, &c., while the material left, when deprived of the oil, makes a superior feed for cattle.

Reference is to be had to the accompanying drawings, forming a part of this specification, in which similar letters of reference indicate corresponding parts in all the figures.

Figure 1 represents a plan view of the mechanism used in carrying out my invention; Fig. 2, a partly sectional front elevation of the same; and Fig. 3 is a sectional elevation of the hulling portion of said mechanism. Fig. 4 is a longitudinal section of the screen-box or separator.

A A indicate the sills of a house in which the whole mechanism is contained, and which need not be over sixteen feet square.

Supposing the oil-bearing seeds to be treated are those of the cotton-plant, I first pass said seeds as they come from the gin or gin-stands by a conveyer, B, into the hopper $b$ of a huller, C, for the purpose of removing the hulls from the seeds. This huller is provided with two metal burrs, $c$ $d$, having slots in their faces to receive sharp steel knives $e$, that may be held in their places by wedges or otherwise. At a convenient position within the hopper $b$ is a feed-roll, $f$, which regulates the feed. The one, $c$, of said burrs is stationary, and may be cast in one piece with the hopper, and the whole securely fastened to the bed-plate $h$. The other burr, $d$, is a rotatable one, hung upon a mandrel, $i$, which is driven by belt $k$ and pulleys $l$ $m$ from an overhead main shaft, D, and which is adjustable by means of a hand-screw, $n$, to regulate the distance of the rotating burr from the stationary one. A sheet-iron or other casing, $o$, incloses the burrs, and is provided with a spout, $p$, which conveys the hulled seed into a screen-box or separator, E. Here the hulls are separated from the kernels and the hulls allowed to escape through a chute, F, to the outside of the building, while the kernels pass by another chute, G, direct into a crusher, H.

The screen-box or separator E is provided with two sieves, $a^2$ $b^2$, which are rigidly connected together, the same being suspended by pivoted bars or rods $c^2$ within said box and adapted to receive from the eccentrics or pulleys $d^2$, connected by pitmen $d^3$ to the sieve $a^2$, a reciprocating movement, one of which eccentrics serving as a pulley around which is passed a belt connecting, in practice, with a pulley on the shaft D. The sieves $a^2$ $b^2$ have opposite inclinations, the upper one, $a^2$, discharging the kernels upon the lower one, and the latter discharging the kernels into a conveyer, B', disposed below the said sieves, in the bottom of the screen-box or separator E, whence, as before stated, they enter the chute G, passing from the latter into the crusher, while the hulls are discharged from the lower sieve into the chute F.

I prefer to arrange the separator E and huller C upon an elevated platform, so as to be about on a level with the gin-stands in the gin-house.

The crusher H, which performs the next stage in the process, is simply a strong iron frame carrying two geared and adjustable chilled rollers, $r$ $s$, driven by belt $a'$ and pulleys $b'$ $c'$ from the same main shaft D which drives the huller and other working devices.

Both the huller and the crusher may be constructed otherwise than as described, but their relative arrangement and connection for automatic action in concert, as specified, is important.

As the kernels leave the crusher H they drop in a crushed condition, free from the hulls of the seed, into a box or receptacle, I, from whence they are shoveled or otherwise conveyed to a heater, J, which, as here shown, is a cylindrical vessel having double walls, so as to admit steam, as by a pipe, $t$, between said walls, to heat the crushed kernels within the vessel, subject while being thus heated to a stirring action, as by a revolving-knife device, K, driven by gearing $d'$ $e'$ from the main shaft D, and rake-teeth $u$, connected with the vessel to insure a uniform heating of the contents of the heater and to reduce the kernels to what may be termed a "condition of cooked meal." This cooked meal I next remove from the heater J—as, for instance, by opening a slide in or near the bottom of said vessel—and after wrapping it in press-cloth in properly-shaped packages, deposit said meal upon a series of successively-arranged press-plates, one above the other, of a hydraulic press, L, the pump M for working which may also be driven by belt $f'$ and pulleys $g'$ $h'$, as shown, from the main shaft D. This press, the particular construction of which it is not necessary here to describe, as any suitable form of oil-press might be used, serves to express the oil from the cooked meal or reduced kernels and deliver the same into a suitable trough or vessel set to receive it.

By the treatment to which the seeds were exposed before introducing them to the press the oil is very perfectly extracted from them in the press, and the cooked meal obtained is so thoroughly deprived of objectionable oil as to make it a most nourishing food for cattle.

Having thus fully described my invention, I claim as new and desire to secure by Letters Patent—

1. In apparatus for extracting oil from cotton and other seeds, the combination of a conveyer for passing the seeds from the gin-stands, a huller for removing the hulls from the kernels of the seed, a screen or separator for separately delivering the hulls and kernels, a crusher for crushing the separated kernels, a combined heater, agitator, and reducer for cooking and reducing said prepared kernels, and a press for extracting the oil from the cooked and reduced mass, substantially as specified.

2. In apparatus for extracting oil from cotton and other seeds, the combination of the conveyer B, the main shaft D, for operating the several devices of the plant, the huller C, the separator E, the spouts F G, the crusher H, the heater J, the stirring and reducing devices K $u$, and the hydraulic press L, with its connected pump M, essentially as shown and described.

CHRISTIAN BAUMGARTEN.

Witnesses:
L. SCHLOTTMANN,
GUSTAV BAUMGARTEN.